April 17, 1951  C. GROSSI  2,549,080
ANIMAL TRAP
Filed Nov. 29, 1946  6 Sheets-Sheet 1

INVENTOR.
Carlo Grossi
BY Woodling & Krost,
Attorneys

April 17, 1951   C. GROSSI   2,549,080
ANIMAL TRAP
Filed Nov. 29, 1946   6 Sheets-Sheet 3

April 17, 1951 C. GROSSI 2,549,080
ANIMAL TRAP
Filed Nov. 29, 1946 6 Sheets-Sheet 4

INVENTOR.
Carlo Grossi
BY
Wiedling and Krost,
Attorneys

April 17, 1951     C. GROSSI     2,549,080
ANIMAL TRAP Filed Nov. 29, 1946     6 Sheets-Sheet 5

INVENTOR.
Carlo Grossi
BY
Woodling and Krost,
Attorneys

April 17, 1951 C. GROSSI 2,549,080
ANIMAL TRAP

Filed Nov. 29, 1946 6 Sheets-Sheet 6

INVENTOR.
Carlo Grossi
BY
Woodling & Krost,
Attorneys

Patented Apr. 17, 1951

2,549,080

UNITED STATES PATENT OFFICE 2,549,080

ANIMAL TRAP

Carlo Grossi, Cleveland, Ohio

Application November 29, 1946, Serial No. 712,891

10 Claims. (Cl. 43—67)

My invention relates to animal traps and particularly animal traps in which rodents such as rats and mice are successively deposited in a container.

An object of my invention is the provision of a trap constructed for the efficient and rapid ensnarement of undesired animals such as rats, mice and the like.

Another object is the provision of a trap which successively and rapidly catches such animals as rats and mice with such dispatch as has heretofore been unobtainable.

Another object is the provision of a trap in which the weight of the animal in the trap operates the moving parts thereof.

Another object is the provision of a trap in which the weight of the animal moving through the trap both causes the exits to be blocked and the trap to be re-set for an animal to follow.

Another object is the provision of a trap so designed that the animals are moved therethrough very rapidly and the trap is re-set for a following animal with a minimum of time expended.

Another object of my invention is the provision of a trap adapted for trapping a large number of animals in a given period of time, each animal being trapped requiring such a small portion of time for its entrapment that a large number of animals may successively be ensnared within a short period of time.

Another object is the provision of a trap so designed that it is peculiarly adapted to the psychology and behavior of animals such as rats and mice.

Another object is the provision of a trap so constructed that the habits and instincts of animals such as rats and mice are taken advantage of to successfully trap such animals.

Another object is the provision of a trap for animals such as rats and mice which is so arranged that the animals about to enter the trap have a clear view through the structure and are thereby further enticed to enter the trap.

A further object is the provision of an improved trap producing results not heretofore obtainable.

Other objects and a fuller understanding of my invention may be had by referring to the following description and claims, taken in conjunction with the accompanying drawing, in which:

Figure 6 is a view looking into the back of the trap toward the rear of the trap and is generally a view along the line C—C of Figure 1, and of line D—D of Figure 5. In Figures 2, 3 and 6, the left-hand end of the views are omitted as the right-hand end and the left-hand end are similar in structure;

Figures 11, 12 and 13 are enlarged detailed views of the ejectment or animal-fall mechanism shown at the front, central and uppermost portions of the trap shown in Figure 1;

Figure 13 is a plan view looking down on the top of the ejecting mechanism with the top panel moved therefrom and shows the arrangement of the parts in ready position. Figure 12 is a view taken along the line E—E of Figure 13 and in the direction of the arrows E—E;

Referring to the several views of the drawings and particularly to Figure 1 for the general arrangement of the parts I describe my trap as follows:

The preferred embodiment of my trap has seven generally defined spaces or portions. There is a first or entrance compartment 21 into which the animal first enters. There is also a similar compartment 21—a that is located at the other end of the trap. Between the two entrance compartments there is a food or bait compartment 23 which serves to hold bait for enticing animals into both compartments 21 and 21—a. In front of each entrance compartment there is an enclosed space for housing an elevator mechanism or intermediate compartment. This enclosed space on the right hand is generally denoted by the reference character 22 and the enclosed space on the left hand is denoted by the reference character 22—a. Between the two enclosed spaces 22 and 22—a is a container compartment 25 at the front portion of the trap and which serves to contain animals trapped through either the right hand parts 21 and 22 or the left hand parts 21—a and 22—a. Immediately above the container compartment 25 is the ejectment or animal-fall or exit compartment which serves to deposit animals from both of the operating sides of the trap into the container below. A runway 26 at the top of the enclosed space 22 connects the right-hand trapping arrangement with the ejectment mechanism 24 and a runway 26—a connects the left-hand trapping arrangement with the ejectment mechanism 24.

Because the compartment 21 is similar in construction to compartment 21—a the arrangement of parts will be described in detail only in respect to compartment 21. Likewise because the enclosed space 22 is similar in construction to the enclosed space 22—a the detailed arrangement of parts will be described only in connection with the enclosed space 22. In other words, this is a duplex trap shown as the preferred embodiment of my invention and in this form of trap the right side and left side are similar. The central portion made up of the food compartment 23, the container compartment 25 and the ejecting mechanism space 24 serve in common for both the portions 21 and 22 and portions 21—a and 22—a.

The first or entrance compartment 21 has three inlets or entrance openings 27 situated along the bottom thereof. Spaced above the inlets 27 are two inlet openings 28. The inlets 27 and 28 are holes formed in the panel side of the trap as shown in Figures 1, 4, 5 and 6. The size of the openings 27 and 28 is dependent upon the animals to be entrapped. For rats the openings are just large enough for a rat to go through and for mice the openings are of a size just sufficient to permit mice to go through. If the openings are too large for the animals being trapped they are not so likely to enter as they would if the openings were properly proportioned to their size. It is also found that openings formed with a flat bottom and flat sides as shown for the lower openings 27, are more attractive for rats and mice because the openings more nearly conform to the shape the animals make themselves. Formed in the inner wall of the compartment 21, that is, at the end opposite the openings 27 and 28, are similarly matched openings or inlets 38 and 37. There are two openings 37 in direct alignment with the openings 28. Likewise there are three openings 38 in direct alignment with openings 27. The left-hand compartment 21—a also has inner openings 37—a which correspond to openings 37 and openings 38—a which correspond to openings 38. The corresponding openings of the trap are all in direct alignment so that when the openings are unblocked or not closed a direct view is seen through the trap from end to end. Thus when all these openings in the compartments 21 and 21—a are opened a rat or other animal looking into the trap through the openings at either end gets a clear and unbroken view. The trap is seen by the animal to be open at the farthest end and it appears clear and safe for its entry. This feature is a particular enticement for animals such as rats and mice which makes them feel safer in entering the trap and causes them to enter the openings 27 and 28 at either end without the hesitation and caution which they otherwise would have. Because some of these animals sometimes like to enter an opening at a higher level while others like to enter openings on the level of the surrounding surface, the openings 28 are provided above the openings 27. The arrangement is such that rats and mice are enticed to enter the inlet openings at the opposite ends of the trap and to do so rapidly and with little hesitation.

Figure 6:
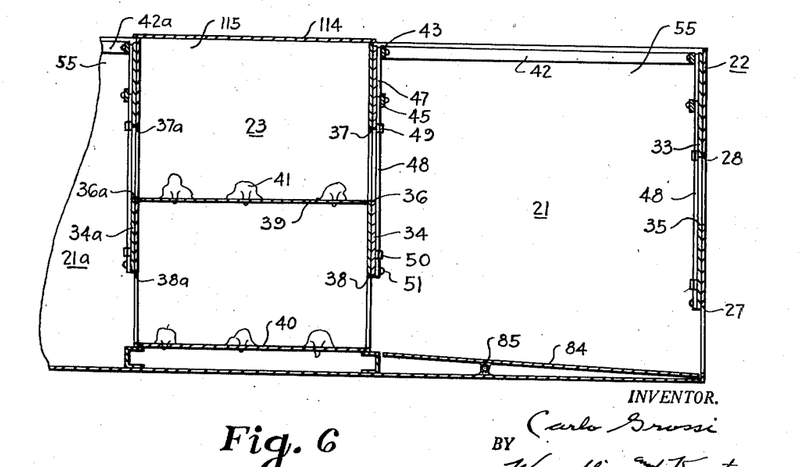

The food or bait compartment 23 is positioned intermediate of, and in alignment with, the entrance compartments 21 and 21—a. The wall 55 which runs the length of the trap approximately half-way between the front and rear walls thereof divides the food compartment 23 from the container compartment 25. There is a rear wall, as shown in Figure 1, which runs the length of the trap along the back thereof and this common rear wall forms the back of the food compartment 23. The four walls of the rectangularly shaped compartment 23 form a well and in this well the shelves or trays 39 and 40 are positioned. The trays 39 and 40 are carried by removable front and rear walls which slide down in the well of the food compartment. In Figure 6 the removable back wall 115 is shown while the removable front wall of the food compartment is not shown in that view. The top 114, the removable back wall 115, the removable front wall, and the shelves 39 and 40 are joined together and adapted to be slid up as a unit in and out of the trap. Suitable food for bait, denoted by the reference character 41 is positioned on the trays 39 and 40. Pins or other fastening means secure the bait in position on the trays. The fixed or permanent end walls of the food compartment have the openings 37 and 37—a and the openings 38 and 38—a formed therein. As seen in Figure 6, the food or bait on the shelves 39 and 40 is in direct alignment with the several openings 27, 28, 37, and 38, of the first compartment 21, and the corresponding openings in the compartment 21—a.

Figure 5:
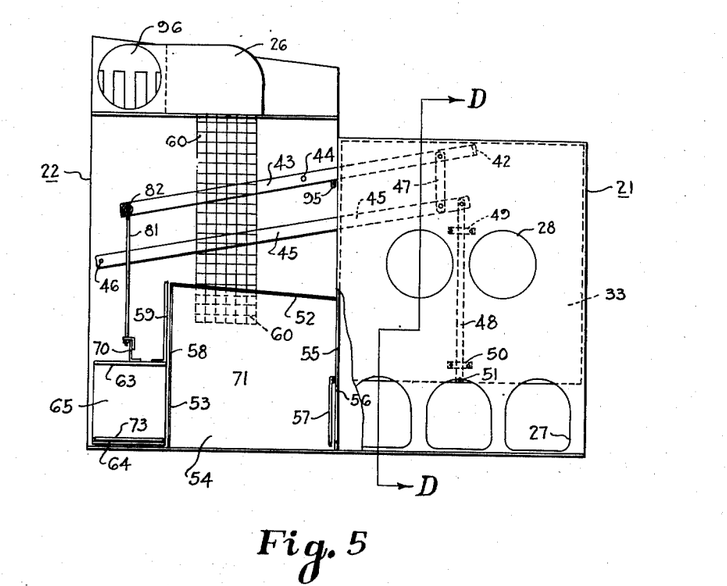
Figure 5 is a view similar to that of Figure 4 but with the exception that the moving parts are shown in second of two positions between which the moving parts move.

At the opposite ends of the compartment 21 and next adjacent the end walls thereof are vertical sliding doors. The sliding door next adjacent the outer wall is denoted by the reference character 33 and the sliding door next adjacent the inner-most end of the compartment 21 is denoted by the reference character 34. The sliding doors 33 and 34 are similar in construction and arrangement. The sliding door 33 has two openings 35 adapted to register with the two openings 28. The sliding door 34 has two openings 36 adapted to register with the openings 37. When the sliding doors 33 and 34 are in raised position as shown in Figures 5 and 6, the openings 28 and 37 are in an open position because of the registrations with the openings in the sliding door. Also when the sliding doors are in a raised position the lower openings 27 and 38 are cleared by the doors and are in an open position. Thus when the sliding doors 33 and 34 are raised together the aligned openings of the compartment 21 are clear and open and when the doors are in a downward position the aligned openings are closed and shut.

The vertically sliding doors 33 and 34 are carried and simultaneously operated by a system of levers. These levers are shown in Figures 4, 5, 6, 8 and 9. Two upper levers 43 and two lower levers 45 extend through slits or openings 83 in wall 55. A pair of levers 43 and 45 are attached to sliding door 33 and a similar pair of levers 43 and 45 carry sliding door 34. The upper levers 43 are interconnected at one end by a cross piece or connecting portion 42 so that the bars or levers 43 with the portion 42 are of U form. The upper levers 43 are pivoted upon pins 44 mounted on the side walls of the trap structure. Lower levers 45 are pivoted upon pins 46 carried by the side walls of the trap structure. A connecting link 47 pivotally connects the rearward ends of the levers 43 and 45, respectively. A vertical bar 48 is secured at its lowermost end to the bottom portion of the respective sliding door by a pin 51. Straps or guides 49 and 50 secured to the sliding doors hold the bars 48 in position. The straps 49 and 50 are arranged to permit some side movement or side slippage between the bars 48 and the respective sliding doors. Each vertical bar 48 is pivotally connected to the rearward end of the lower bar 45. Movement of the rearward ends of the bars or levers 43 and 45 causes the vertical bar 48 to move up and down and consequently raise and lower the respective sliding door. Because of the arc through which the levers 43 and 45 swing the vertical bar 48 pivoted by pin 51 to the sliding doors moves to some degree in the straps or guides 49 and 50. The cross piece 42 effectively ties together the levers 43 and 45 at their rearward ends and the levers 43 and 45, the links 47 attached to each pair of levers, the vertical bars 48, and the respective sliding doors move together in unison. The arrangement of the levers on their respective pivots as shown in the drawing provides for a maximum vertical movement of the sliding doors in relationship to the swinging of the levers. The sliding doors guided in appropriate channels or guides freely move up and down without cocking by reason of the arrangement shown.

Figure 4:
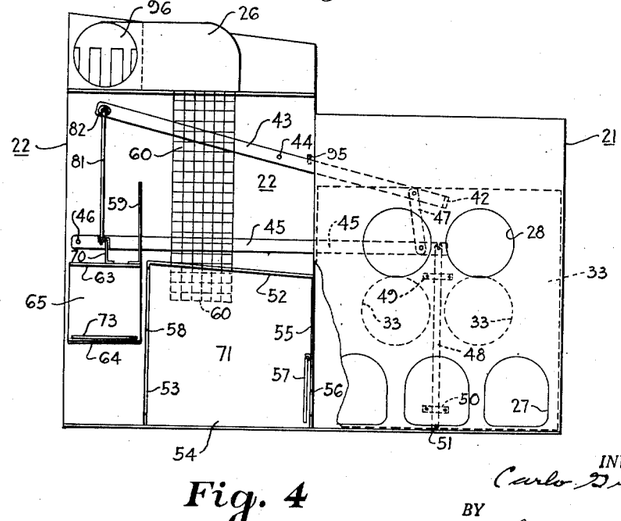
Figure 4 is a view of the right-hand end of my trap with the side panel of the front portion removed to show the inner mechanical parts and showing the vertically sliding door to the rear portion in dotted lines. This view shows the moving parts in one position. The view of Figure 4 is generally along the line B—B of Figure 1.
Figure 9:
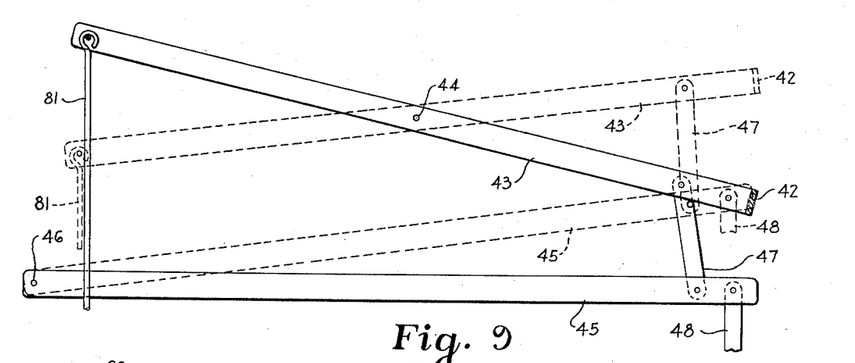
Figure 9 is an enlarged detailed view of the lever system connecting the elevator mechanism and the vertically sliding doors of my trap.

In Figures 4 and 5 there are shown the two opposite positions of the sliding doors and supporting levers. In Figure 5 the levers are shown in such a position that the sliding doors 33 and 34 are in a raised position. In Figure 4 the levers are shown in the arrangement wherein the sliding doors are in a closed position. Figure 9 shows the levers 43 and 45 in full when the doors are in lowered position and in broken lines when the doors are in raised position.

Within the enclosed space 22 formed by the walls of the trap, and likewise within the corresponding enclosed space 22—a, there are two passage ways or rooms 71 and 72. The passage ways 71 and 72 are formed by the top wall 52, the front wall 53 and the back wall 55. The back wall 55 is the dividing wall which runs the length of the trap from one end to the other end which also divides compartment 21 from the enclosed space 22, compartment 21—a from enclosed space 22—a, and the food compartment from the container compartment. The bottom supporting wall of the trap forms the bottom wall of the passage ways 71 and 72. A partition 54 extends between the top wall 52 and the bottom wall to divide the space into the two separate passage ways 71 and 72. The passage ways 71 and 72 are in the form of small rooms and in the embodiment shown passage way 72 is of larger dimensions than passage way 71.

Near the bottom of the passage way 71 and providing communication between compartment 21 and the passage way 71 is a small opening 56 of a size suitable to accommodate an animal to pass therethrough. A hinged gate or flap valve 57 is located at the opening 56. The gate 57 is adapted to swing inwardly of the passage way 71 when an animal in compartment 21 presses against the gate but by reason of its disposition will not open in the reverse direction to permit an animal to move back from the passage way 71 to the compartment 21. Near the upper portion of the passage way 71 and in the front wall 53 is another opening of similar size denoted by the reference character 58. The opening 58 is adapted to permit an animal to move therethrough from the passage way 71 and is sufficiently low to permit an animal, such as a rat or mouse, to climb up through the opening 58 from the passage way 71.

Located in the front wall 53 of the passage way 72 and adjacent the bottom of the passage way 72 is another opening 61 of a size sufficient to pass an animal, such as a rat or mouse, therethrough. Mounted at the opening 61 is another hinged gate or one-way valve 62. The disposition of the gate 62 is such as to permit the gate 62 to open when an animal presses it from outside and to permit the animal to enter the passage way 72. The one-way disposition of the gate 62 however is such that the animal may not return through the opening 61. Therefore an animal entering passage way 72 from in front of the wall 53 is blocked from leaving the passage way 72 through the opening 61. The several hinged gates or one-way valves used in the trap, such as gates 57, 62, and 117 are round metal discs with slots cut therein. The slots are such as to permit an animal such as a rat to look therethrough and to be enticed into moving against the gate and moving it open, when moving in one direction. The remaining portions of the metal discs separating the slots form bars which prevent the animal from moving through the openings unless and until the gates swing on their respective hinges, the gates being swingable only in one direction so that the animals may move through the openings only in the direction desired. The size of the openings are of course proportioned to the size of the animals to be trapped, being sufficiently large to permit the animal to readily move through the opening by pushing the gate in the proper direction. The gates are so constructed that the animals may not move through the openings in an opposite direction.

Extending upward from the passage way 72 through the upper wall 52 is the vertical tunnel 60. The vertical tunnel 60 is preferably of hollow cylindrical shape made of a roll of wire netting or other similar material which will permit an animal, such as a rat or mouse, to be able to climb up through the interior of the tunnel to secure purchase on the inner walls thereof. The lower end of the vertical tunnel 60 is opened and opens up into the passage way 72. The lower end of the tunnel 60 is low enough that an animal, such as a rat or mouse, may easily reach the lower end of the tunnel 60 and climb up through its interior from the passage way 72. The upper end of the tunnel 60 opens into the runway or tunnel 26 on the top of the trap. The horizontally disposed tunnel 26 is hollow and provides communication between the tunnel 60 and the enclosed space 97 of the ejecting mechanism 24 on the top of the trap. Of course a similar vertical tunnel 60—a extends up through the enclosed space 22—a to communicate with the corresponding runway 26—a also opening into the space 97 of the ejecting mechanism.

My trap includes an intermediate compartment through which the rat, mouse or other animal moves in stages from the entrance compartment 21 to the ejecting mechanism or exit compartment 24. This intermediate compartment is in the form of an elevator positioned in the front part of the enclosed space 22 adjacent to and immediately in front of the front wall 53 of passage ways 71 and 72. This elevator is comprised of an upper wall 63, a lower wall 64 and two end walls 65 forming four walls of the intermediate compartment. The wall 53 forms one wall to enclose the compartment and the front panel 29, that is the front wall of the trap, forms the other enclosing wall. The intermediate compartment is thus composed of four walls which are movable and two walls which are stationary. In Figures 2, 3, 4 and 5 the front panel 29 which slides into place on the front of the trap has been removed to better show the arrangement of the parts. The walls 63, 64 and 65 are movable together up and down and are thus spoken of as an elevator. The elevator moves between two positions, the upper position being shown in Figures 2 and 4 and the lower position being shown in Figures 3 and 5.

There is a guide wall 66 adjacent and spaced from each end wall 66. A channel guide 69 secured to the inner walls of the trap accommodates the respective guide walls 66 and thus the movement of the elevator up and down is guided to move in a vertical direction.

A cross-beam 70 extends across the top of the elevator and is secured to the top wall 63 thereof at intervals. This beam 70 supports the elevator and provides rigidity thereto. Two vertical support rods 81 are secured by a threaded fastening or other suitable means to the beam 70 near each end thereof. The upper ends of the rods 81 are secured to and carried by a cross-rod 82. The support rod 82 is secured to and extends between the ends of the levers 43. As the front ends of the levers 43, that is the left end as shown in Figures 4 and 5, move up and down during the swinging motions of the levers, the cross-rod 82 is moved up and down. As the cross-rod 82 moves up and down the two support rods 81 move vertically up and down in correspondence thereto and the elevator carried by the beam 70 is likewise moved in a vertical direction.

Figure 2:
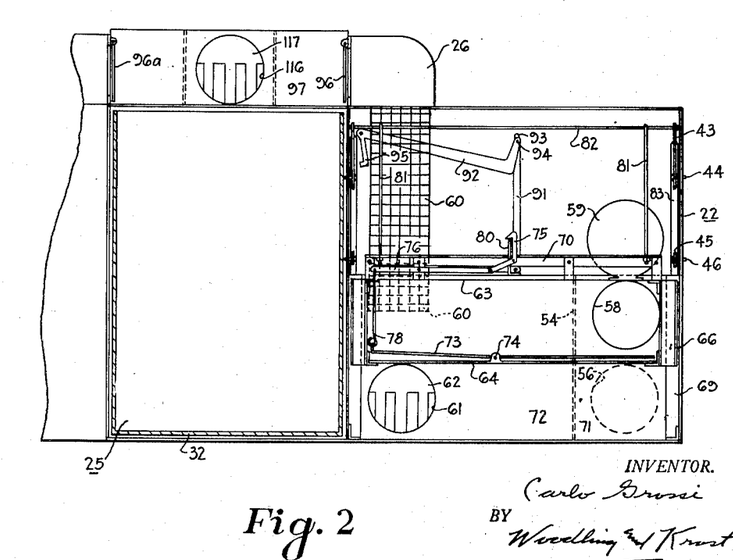
Figure 2 is a view looking into the front of my trap taken along the line A—A of Figure 1 with the right-hand panel of the front removed to show the working parts therein. In this view the moving parts are shown in one position.
Figure 3:
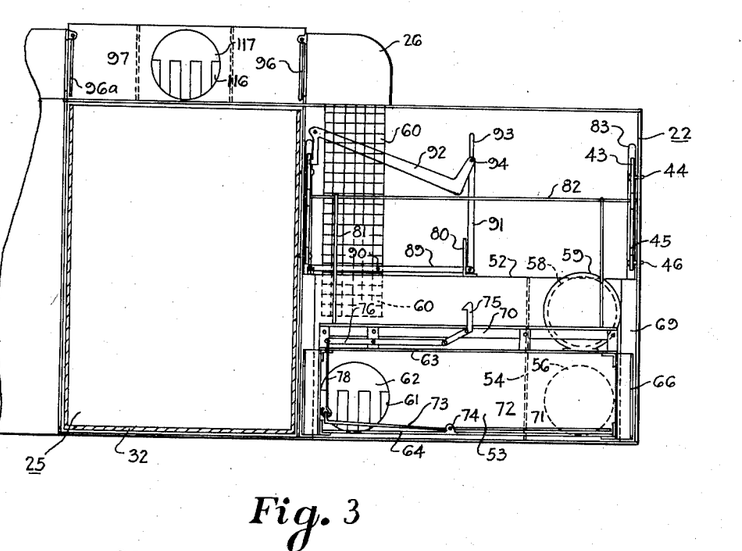
Figure 3 is a view similar to that of Figure 2 but with the difference that the moving parts are shown in the other of two positions.

It is to be noted that when the elevator is in its lower position the intermediate compartment defined by the movable walls and the stationary walls are adjacent the lower opening 61 as in Figures 3 and 5. Thus in this lower position of the elevator the intermediate compartment is in communication with the opening 61 into the passage way 72 but is out of communication with the opening 58 leading from the passage way 71. A guard member 59 in a form of a metal disc is secured to the upper surface of the wall 63 of the elevator. The vertical guard 59 moves up and down with the elevator so that when the elevator is in the lower position of Figures 3 and 5 the opening 58 of the passage way 71 is blocked or closed by the guard 59. In this position an animal in passage way 71 cannot leave the passage way 71 through the opening 58. However, when the elevator is in its upper position, as shown in Figures 2 and 4, the guard 59 is carried up by the elevator away from the opening 58. When in this upper position of Figures 2 and 4 the intermediate compartment formed by the movable walls of the elevator is in communication with the opening 58 from the passage way 71. It is thus seen that the movable intermediate compartment enclosed by the movable walls between the stationary walls is alternately in communication with the opening 58 from the passage way 71 and the opening 61 into the passage way 72.

Figure 7:
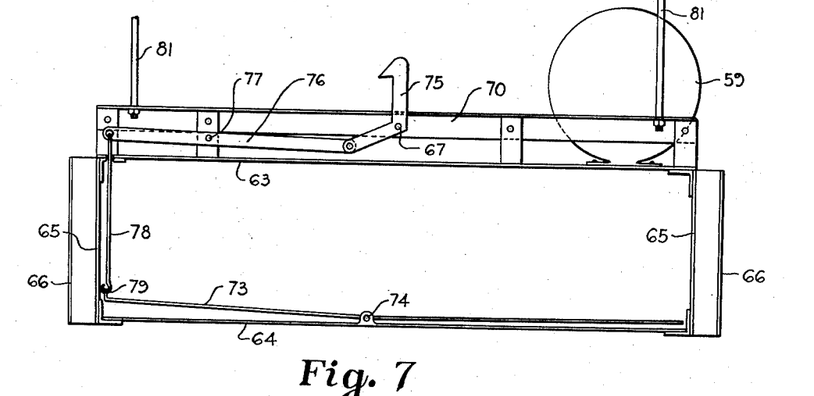
Figure 7 is an enlarged detailed view of the elevator mechanism which moves between an upper position and a lower position as shown in Figures 2, 3, 4 and 5.
Figure 8:
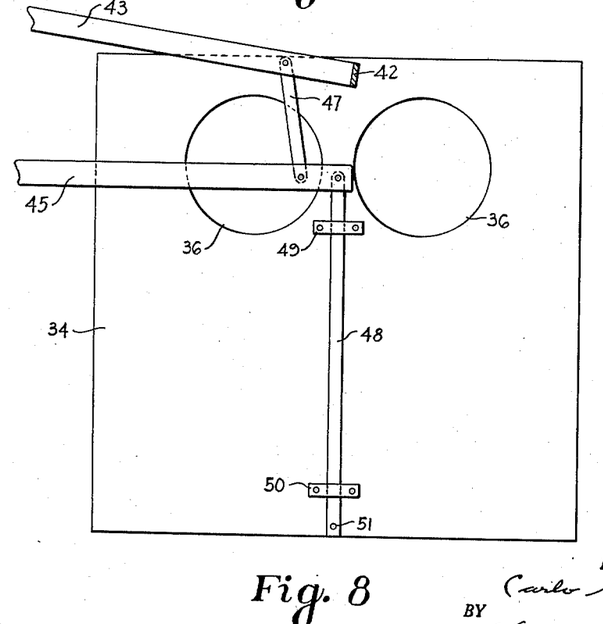
Figure 8 is an enlarged detailed view of one of the vertically sliding doors and the levers attached thereto as used in my improved trap.

Disposed along the bottom of the elevator adjacent the bottom walls 64 thereof is a treadle 73. The treadle 73 substantially covers the bottom of the elevator and is hinged intermediate of its ends by means of the hinge 74 to the bottom wall 64. The treadle 73 on one side of the hinge 74 is somewhat angularly disposed to the portion on the other side of the hinge 74 so that the treadle 73 may operate in the usual manner to swing on the hinge. A connecting rod 78 is secured by a hooked portion 79 thereof to the left-hand end of the treadle 73 as viewed in Figures 2, 3, and 7. The upper end of the connecting rod 78 is secured to the left-hand end of lever 76 which in turn has its right-hand end secured to the movable latch member 75. The latch member 75 is pivoted on pin 67 to the beam 70 and the lever 76 is pivoted on the pin 77 to the beam 70. The balance of the treadle 73 on the hinge 74 is such that the right-hand end of the treadle is slightly heavier than the left-hand end and is so biased that the connecting rod 78 is in the upper position shown in Figure 7 and the latch member 75 is pivotally swung so that its top is in the position of Figure 7. The bias of the treadle 73 is such that when the weight of an animal, such as a rat or mouse, is on the left-hand end of the treadle, that is, nearest the connecting rod 78, the bias is overcome and the treadle moves to pull the rod 78 down to actuate the lever 76 thereby throwing or swinging the top of the latch member 75 to the right or unlatched position. A stationary catch member 80 carried by the top wall 63 of the passage way 72 is adapted to engage with the movable latch member 75. As shown in Figure 2 when the treadle is in its normal position its bias causes the latch member 75 to remain locked or caught on the stationary catch member 80. The weight of an animal on the treadle 73 at its end closest to the container compartment 25 causes the treadle to move and through its linkage with the latch member 75 to cause disengagement of the latch member 75 with the stationary catch member 80. The chamfered top surface of the latch member 75 enables it to slide past the catch member 80 when the elevator is moving upwardly and to catch on the top of the stationary member 80 when the elevator is in its upper position.

The levers 43 and 45 extend through slits 83 in the wall 55 between the first or entrance compartment 21 and the enclosed space 22. The levers form a balance with the movable intermediate compartment or elevator carried in counterbalance to the two vertical sliding doors 33 and 34 of the entrance compartment 21. The weight of the sliding doors is slightly greater than the vertically moving elevator or the arrangement is biased slightly so that in normal position and with no extraneous weight the trap doors 33 and 34 tend to move the lower position of Figure 4 and the elevator tends to be in the upper position shown in the Figures 2 and 4. The baising of the arrangement is such that the weight of the animal desired to be trapped, such as a rat or mouse, will overcome the biasing of the arrangement and cause the elevator to move downwardly and the sliding doors to move upwardly to the position shown in Figures 3 and 5. The biasing of the arrangement is made by adjusting the relative masses of the parts, the operative length of the lever or by other suitable biasing means. The counter-balancing or biasing may be finely adjusted so that the weight of a rat or mouse on the elevator between the upper and lower walls thereof will overcome the bias to move the elevator down and the sliding doors upward. The weight of the animal, such as a rat or mouse, on the treadle 73 at its end secured to the rod 78 causes the latch member 75 to release and to permit the elevator to immediately move downwardly to the lower position shown in the Figures 3 and 5. When the weight of the animal is removed from the elevator then the parts tend to move so that the elevator goes upwardly and the sliding doors move downwardly to the position shown in Figures 2 and 4. When the elevator moves upwardly without the animal the latch member 75 automatically catches on the stationary catch member 80 and holds the elevator in the raised position until an animal in the elevator again releases the latch and causes the elevator to move downwardly.

Figures 10, 14:
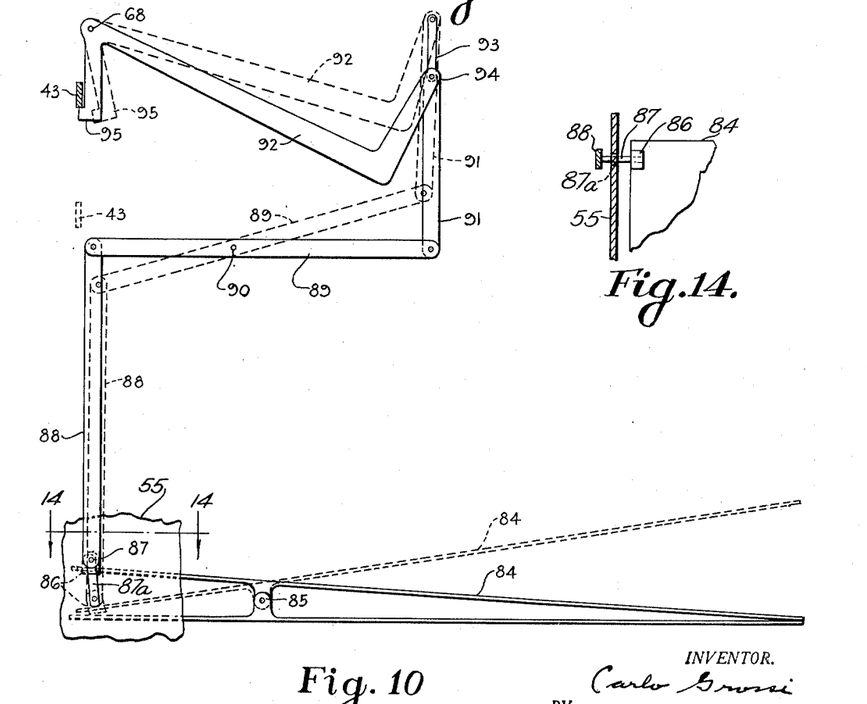
Figure 10 is an enlarged detailed view of a catch mechanism which alternately holds the sliding doors in raised position and permits the sliding doors to fall to a closed position.
Figure 14 is a partial plan view looking in the direction of the arrows 14—14 of Figure 10.

There is a treadle 84 which substantially covers the bottom of the entrance compartment 21. The treadle 84 is in the form of a flat plate slightly smaller than the bottom surface of the entrance compartment 21. A hinge 85, as shown in Figure 10, provides the pivot upon which the treadle 84, as illustrated in Figures 10 and 14, moves. The bias of the treadle 84 is such that the right-hand end in Figure 10 is normally down and the left-hand end is normally up. In other words, the treadle 84 is biased so that its surface near the entrance opening 27 to the entrance compartment 21 is down close to the bottom of the compartment. The weight of the rat or mouse on the left-hand end, as shown in Figure 10, overcomes the bias of the treadle 84 and causes it to swing to the position shown in dotted lines in Figure 10. In other words, the weight of the animal on the portion of the treadle 84 closest to the bait compartment 23 as shown in Figure 6 will cause the treadle to operate and overcome the normal bias. A horizontal rod 87 fits into a small slot 87—a in wall 55 and the end thereof is secured by the fastening 86 to the left-hand end of treadle 84. Movement of the treadle 84 causes the horizontal rod 87 to move up and down and to translate its movement through the wall 55. As the treadle 84 swings on the hinge 85 the rod 87 is correspondingly moved.

Within the enclosed space 22 and next adjacent the back wall 55 thereof are a series of levers operated as the rod 87 is moved up and down by the treadle 84. Link members 88, 89 and 91 pivotally connected together as shown in Figure 10 operatively connect the treadle 84 through rod 87 to an end of crank arm 92. The arm 92 is pivotally carried by the pivot pin 68 secured to the wall 55. A pivot pin 94 connects the link member 91 to an end of crank arm 92 and the pivot pin 94 also extends into and is guided in its up and down movement by the slot 93 in wall 55. Link member 89 pivotally swings on a pivot pin 90 carried by the wall member 55. The crank arm 92 has a short end with a catch portion denoted by the reference character 95 in Figure 10. The short catch portion being rigid with the remainder of the crank arm 92 swings to the left or right as the pin member 94 moves down or up in the guide slot 93.

As shown in Figure 10 when the treadle 84 is in its normal biased position, as shown in full lines in Figure 10, the catch portion 95 of crank arm 92 swings to be under, and engages, the lever 43. The catch portion 95 thus acts to catch and hold the lever 43 in the position shown in Figures 3 and 5 of the drawings. With the lever 43 held in position by catch portion 95 of arm 92 the sliding doors 33 and 34 are held in raised position and the elevator is consequently in its lowered position as shown in Figures 3 and 5. The catch portion 95 of arm 92 thus tends to check or stop the bias of the levers 44 and 45 and to hold the sliding doors 33 and 34 in an upper position so that openings 27 and 28 and openings 37 and 38 of the entrance compartment 21 are in a clear and unclosed condition.

Upon the treadle 84 being actuated by the weight of a rat or mouse to the position shown in dotted lines in Figure 10, the link members 88, 89 and 91 cause the crank arm 92 to move up to the position shown in dotted lines in Figure 10 and thus permits the catch portion 95 to release the lever 43. This lever 43 is then free to move downwardly because of the bias of the lever arrangement to the position shown in dotted lines in Figure 10.

It is thus seen that an animal, being trapped upon entering the entrance compartment 21 and moving toward the food compartment 23, by its weight actuates the treadle 84 which in turn releases the levers from their locked positions and permits the sliding doors 33 and 34 to move downwardly and to immediately block or close the openings 27 and 28 and openings 37 and 38. Likewise an animal in the elevator actuates the treadle 73 to release the catch 75 and the weight of the animal carries the elevator downwardly and again raises the sliding doors 33 and 34 to reopen openings 27 and 28 and openings 37 and 38. The arrangement is thus that animals going through the compartments and passageways of the trap so operate the mechanism that the animals are moved from one door to the other without opportunity for return and the trap is automatically re-set to receive successive animals entering the trap and moving therethrough.

Figure 11:
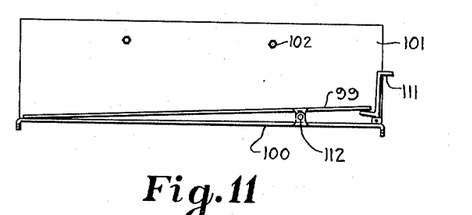
Figure 11 is a side view of the ejector member embodied in the ejecting mechanism.
Figure 12:
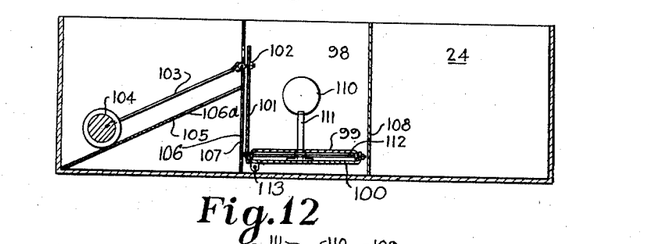
Figure 12 is a sectional view of the ejecting mechanism looking from the front end of the trap toward the rear end thereof and shows the disposition of the parts of the ejecting mechanism in a ready position.
Figure 13:
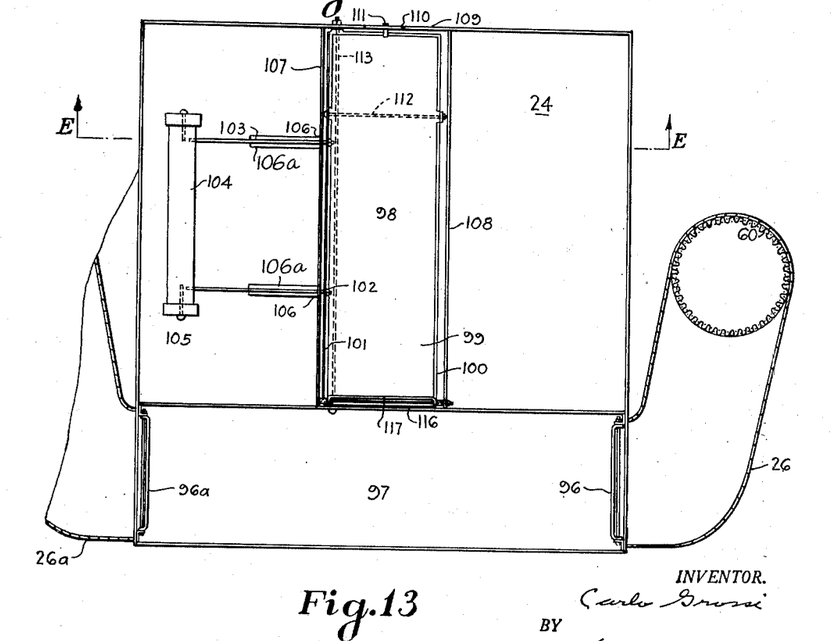

At the upper portion of the trap over the container compartment 25 and positioned to serve the trapping arrangement at both ends of the trap, that is both enclosed spaces 22 and 22—a, is the ejecting mechanism 24. This ejecting mechanism 24 has a removable cover or top 31. Figures 11, 12 and 13 illustrate the arrangement of the parts in the ejecting mechanism 24 with the top 31 removed. At the forward end of the ejecting mechanism 24 is a chamber of common runway 97. The horizontal runway or tunnel 26 leading from the vertical tunnel 60 opens into one end of the chamber 97. The horizontal runway 26—a leading from the vertical tunnel of the enclosed space 22—a, that is from the other end of the trap, opens into the opposite end of the chamber 97. Flap gates 96 and 96—a permit the animals to enter the chamber from the horizontal runways 26 and 26—a, respectively. The hinged gates 96 and 96—a act as one-way valves to permit ingress into the chamber 97 by a rat or other animal but prevent egress therefrom through the same opening. The swing gates 96 and 96—a are slotted in the same way as are swinging gates 27, 62 and 117. Leading from the chamber 97 through an opening intermediate its end is the ejecting room 98. The ejecting room is of a size appropriate to completely contain an animal being trapped. A hinged gate or one-way valve 117 is positioned between the chamber 97 and the ejecting space or room 98. The hinged gate 117 permits the animal to push against the gate and into the space 98 and thus permits ingress into space 98 but does not permit egress therefrom. The enclosed space 98 is bottomless and in the enclosed space 98 there is positioned an ejector comprised of the bottom plate 100 in a horizontal position and a top plate 101 in a vertical position. The ejector is biased so that in a normal unloaded condition the bottom plate 100 closes the bottom of the enclosed space 98.

For biasing the angle shaped ejector into the normal position shown in Figures 12 and 13 a roller weight 104 is attached to the upper portion of the vertical plate 101 by means of the rods 103. Screw bolts or fastenings 102 secure the rods 103 to the one arm of the angular ejector. Adjacent the space 98 there is provided the inclined surface wall 105. Walls 107 and 108 of the enclosed space 98 form the side walls of the space 98. In the wall 107 there are provided small slotted openings 106 and in the inclined surface wall 105 there are slotted openings 106—a aligned with openings 106, respectively, in wall 107. Through these aligned openings the respective rods 103 may move as the roller 104 moves up and down on the incline 105. As the ejector tilts or swings on the long rod 113 through an arc of 90 degrees the roller 104 moves upwardly on the incline 105. The weight of the roller 104 biases the ejector to cause the ejector to swing back to its normal position shown in Figures 12 and 13 and to thus close the bottom of the enclosed space 98.

A treadle 99 is mounted to the ejector by being hinged on hinges 112 to the bottom plate 100 of the angle shaped ejector. The forward and longer portion of the treadle 99 is heavier than the rearward shorter portion. The treadle 99 has a slight bias by means of this unbalance so that the treadle 99 is normally in the position shown in Figure 11. The rearward end of the treadle 99 rests upon the pivoted hook or catch 111. When the animal operates the treadle 99 by placing its weight on the rearward short portion thereof, that is at its end farthest from the hinged gate 117, the treadle 99 tilts somewhat to swing the pivoted hook or catch 111 inwardly toward the hinge 112. The rear wall of the ejecting mechanism denoted by the reference character 109 closes the rear end of the space 98. In this rear wall 109 is a small opening 110 which is small enough to prevent an animal, such as a rat or mouse, from going through the opening 110 but which is sufficient to permit the animal to be enticed toward that opening. The small opening 110 therefore lures the animal up toward and adjacent the release or hook 111 and thus actuates the pivoted hook 111. The hook 111 is biased to normally extend into the small opening 110 and to thus hold the angle shaped ejector in its normal position shown in Figures 11, 12 and 13. The hook of the hooked member 111 rests on the edge of the opening 110 and interengages there with the wall 109. Upon the weight of the animal being impressed upon the rearward or shorter end of the treadle 99 the hooked member 111 is pivoted to move out of the opening 110 and to thus free the ejector and permit it to swing on the hinge rod 113. When the hooked member 111 thus releases the ejector, the ejector is in a position to operate and the weight of the animal on the treadle 99 causes the angular shaped ejector to swing in a 90 degree arc. In moving through this arc the plate member 101 of the angle shaped ejector swings over and forces the animal downwardly and at the same time the bottom plate 100 swings down to a vertical position and support to the animal is removed. Thus, the support is not only taken from the animal but it is forcibly ejected down through the open bottom of the space 98 and into the open top container 32 positioned in the container compartment 25 below. The entrance opening 116 to the enclosed space 98 is kept closed against egress by the hinged gate 117 so that the animal may not escape through the opening 116 but is forced downwardly by the angle shaped ejector into the container 32. As soon as the animal is forced off the ejector and its weight is removed therefrom the counter-weight 104 moving down the incline 105 causes the ejector to swing back into its normally biased position shown in Figures 11, 12 and 13.

The open top container 32 substantially fills container compartment 25. The front of the container 32 may form the front panel or wall of the container compartment 25 or a separate panel or wall may fit over the compartment 25 and enclose the container 32. The container 32 is partially filled with water or other liquid and the animals forcibly ejected into the container 32 are drowned. There is no opportunity of escape for the animal from the container and even if the animal were not drowned it could not climb out of the container.

Figure 1:
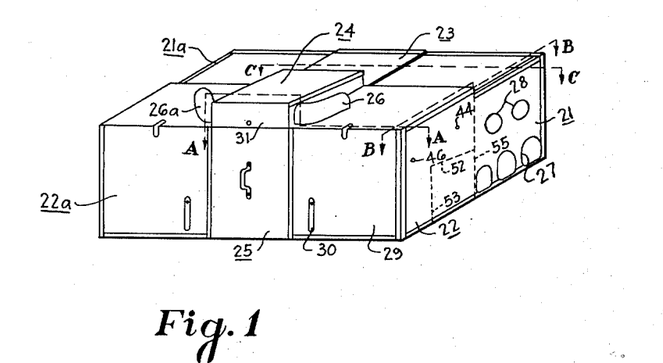
Figure 1 is a perspective view of my improved trap, looking at the front face of my trap and also at the right-hand end of the trap.

Preferably the container 32 is integral with the front panel for the container compartment 25 and a handle on the front panel as shown in Figure 1 provides for the ready removal of the container by taking hold of the handle and sliding it out as a drawer is removed. Duplicate containers may be provided so that if one is removed another may be instantly substituted for it in the trap while the bodies of the animals in the container are being disposed of. The front of the enclosed space 22 is also preferably provided with a removable panel 29 so that the elevator mechanism and lever system may be inspected as desired. To provide for the ready setting of the trap in the first instance a small slot is provided in the panel 29 and a small elongated cover 30 fits over this slot by sliding down into suitable grooves or guides. This elongated cover 30 has a small knob at its upper end for readily removing the cover from the slot. The elongated cover 30 may be conveniently used as a bar whereby one end may be inserted into the small slot and pressed down upon the treadle 73 of the elevator thereby releasing the catch 75 and drawing the elevator down to its lowermost position and consequently drawing the sliding doors 33 upwardly to their upper position where they are locked in position by the catch 95 of crank arms 92. The trap is then set in operating condition for the first animal to enter. The cover 30 is then replaced over the small slot to entirely enclose the space 22.

In operation, the rat, mice or other animals enter one of the openings 27 and 28 of the entrance compartment 21 or enter the corresponding openings of the entrance compartment 21—a. The openings of the food or bait compartment 23 are opened at the same time that the entrance openings are clear so that the animal sees the food and is also able to look straight through the trap to unclosed openings at the farthest ends. The animal then moves toward the food and trips the treadle 84 in the entrance compartment. The operation of the treadle 84 causes the catch 95 of crank arm 92 to release the lever 43 and immediately the sliding doors 33 and 34 slide down at opposite ends of the entrance compartment cutting off escape for the animals both through the entrance inlet through which it entered and also through the food compartment so that the animal never reaches the food and is trapped in the entrance compartment. The animal seeking escape rushes back and goes through the opening 56 in the wall 55 by pushing against the one-way gate 57 to enter the passageway 71. It immediately climbs up through the opening 58 and on to the elevator at its uppermost location. The animal still seeking to escape moves along the treadle 73 on the elevator to its inner end closest the rod 78 where its weight trips or releases the catch 75 and the weight of the animal immediately carries the elevator down to its lower position. Movement of the elevator to its downward position automatically raises the sliding doors 33 and 34 through the inter-connection of the levers 43 and 45. The bias of the treadle 84 and its linkage with the catch portion 95 of crank arm 92 is such that the catch portion 95 moves under the lever 43 and holds it in position to thus lock the sliding doors in raised position. The trap is thus again set for the next animal to enter. The animal on the elevator in its lower position still seeking escape moves into the passageway 72 through the opening 61 by pushing against the hinged gate 62. While the elevator is in its lower position the guard 59 covers the opening 58 so that another animal may not come through the opening 58 until the elevator is again up in its upper position. The animal now in passageway 72 seeking escape reaches up to the vertical tunnel 60 and climbs up through its interior to the horizontal runway 26. From there it moves into the chamber 97 of the ejecting mechanism by pushing against the hinged gate 96. From the chamber 97 the animal enters the space 98 by pushing against the hinged gate 117. The animal in the space 98 still seeking escape moves up towards the small opening 110 at the rear end of the treadle and its weight causes the treadle 99 to release the catch 111. The ejector formed by angularly disposed plates 100 and 101 is free to swing down with the weight of the animal on the bottom plate 100. As the bottom plate 100 swings down in a 90 degree arc the vertical plate 101 likewise swings over and pushes the animal downward so that it cannot hold on to anything nor remain in the space 98. The weight of the animal overcomes the bias provided by the roller weight 104. The animal is thus forcibly ejected and falls down into the container 32 where it is drowned in the water contained in the container or is otherwise entrapped in the container. As soon as its weight is off the ejector the roller 104 causes the ejector to swing back in its normally biased position ready to receive the next succeeding animal.

The arrangement of the trap is such that animals may be concurrently trapped by both operating ends of the duplex trap. The food compartment, the ejecting mechanism and the container compartment is common to both ends of the trap and serves for the entrapment of animals entering from either and both ends of the trap. The mechanism of the trap is fast acting and is such that a series of animals, such as rats and mice, may be successively moving through the trap at the same time. The trap is reset by the animals that move therethrough. It has been found that this trap has proved itself so successful that many times the number of rats and mice ordinarily caught in other traps are caught in this trap under the same factors and circumstances. The rats and mice are caught in such a way that no blood is drawn and consequently there is not an odor which drives away other rats and mice to follow. The trap particularly takes advantage of the psychology and behavior habits of rats and mice in such a way that large numbers of them are entrapped within a relatively short time to a degree far surpassing other traps heretofore known.

Although I have shown a duplex trap having trapping arrangements on both ends it is apparent and to be understood that this is by way of example and that the trap may have one, two or more trapping arrangements within the same unit. In the foregoing description the trapping arrangement on one end only was described in detail but it is understood that the same construction and arrangement is provided at the other end with only such reversal of parts as to bring the inlet openings at the ends of the trap and to provide that the food or bait compartment, the container compartment and the ejecting mechanism serve the trapping mechanism at both ends of the trap. The trap is preferably made of metal or other material which cannot be destroyed or injured by the animals being trapped.

Many of the behavior, psychology and habit factors of rats and mice are taken advantage of by my trap for the successful ensnarement and capture of the animals. Some of these factors, but not all of them, may be briefly referred to as follows: The animals are more liable to enter an opening if they see a clear opening beyond as they hesitate to enter a "dead end" compartment. The animals when conscious of being trapped or when alarmed quickly attempt to escape and preferably to retreat whence they came. The trapped animals in seeking escape go to the closest opening they flind and attempt to push through it. The trapped animals try to climb upwardly, rather than downwardly, in seeking an escape. The trapped animals when support is removed from them attempt to hold on to anything they can and must be forcibly ejected downward upon removal of their support. The trapped animals in seeking escape move very rapidly through the trap. Successive animals tend to follow and seek out an animal preceding them in the trap, particularly if a preceding animal was a female, and so many animals successively follow the first ones if not alarmed or frightened away. Blood drawn on an animal by a trap is an alarm and frightens other animals away and keeps them from following but other animals will successively follow through the trap when the trapped animals are not handled to draw blood. There are other known factors of behavior, psychology and habit which are utilized by my trap to efficiently, rapidly and successfully trap many animals such as rats and mice.

Although I have described my invention in its preferred form with a certain degree of particularity, it is understood that the present disclosure of the preferred form has been made only by way of example and the numerous changes in the details of construction and the combination and arrangement of parts may be resorted to without departing from the spirit and the scope of the invention as hereinafter claimed.

I claim:

1. In a trap for rodents, the combination of an entrance compartment, said entrance compartment having an inlet for rodents, a bait compartment adjacent said entrance compartment, said bait compartment and said entrance compartment having a common opening, said bait compartment having another opening opposite said common opening, said inlet, said common opening and said another opening being in substantial alignment to provide a clear view and open path therethrough from said inlet, movable closures adapted to close said inlet and said common opening, and means responsive to movement of a rodent in said entrance compartment for moving said closures into closed position.

2. In a trap for rodents, a pair of entrance compartments, a bait compartment intermediate of said entrance compartments, an inlet opening in each entrance compartment, each said entrance compartment and said bait compartment having a common opening therebetween, said inlet openings and said common openings being in substantial alignment to provide a clear view and open path therethrough, closure means for closing said inlet openings and common openings, and operating means responsive to movement of a rodent in each entrance compartment for operating said closure means to close the said inlet opening and said common opening of the respective entrance compartment.

3. In a trap for rodents, a pair of entrance compartments, a bait compartment positioned intermediate of said entrance compartments, each said entrance compartment having an inlet opening for ingress of a rodent to said entrance compartment, each said entrance compartment and said bait compartment having a common opening therebetween of a size suitable for passage of a said rodent therethrough, said inlet openings and said common openings being arranged to provide an unobstructed view and open passageway from each inlet opening through said common openings to the other inlet opening, movable means positioned at said inlet openings and common openings and adapted to prevent passage of a said rodent therethrough, and operating means responsive to the presence of a rodent in each entrance compartment for operating said movable means to close the said inlet opening and said common opening of the said each entrance passageway, whereby rodents may be enticed into said entrance compartments by bait in said bait compartments and by said arrangement of openings and rodents may not pass through either of said common openings from either of said inlet openings.

4. In an animal trap, the combination of an entrance compartment, said entrance compartment having an inlet opening for animals, a bait compartment adjacent said entrance compartment, a first passageway between said entrance compartment and said bait compartment suitable for passage of an animal therethrough, a second passageway opening into said bait compartment suitable for passage of an animal therethrough, said first passageway being positioned intermediate of said inlet opening and said second passageway, the arrangement of said passageways and said inlet opening providing a view of a clear and open path from said inlet opening through said first passageway and second passageway, movable closures adapted to close said inlet opening and said first passageway, first means responsive to the presence of an animal in said entrance compartment for moving said closures into closed position, movable blocking means adapted to block said second passageway against entry of an animal into said bait compartment, and second means responsive to the presence of an animal in the vicinity of said second passageway outwardly of said bait compartment for moving said blocking means into blocking position.

5. In an animal trap, the combination of an entrance compartment, said entrance compartment having an inlet opening for animals, a bait compartment adjacent said entrance compartment, a first passageway between said entrance compartment and said bait compartment suitable for passage of an animal therethrough, a second passageway opening into said bait compartment suitable for passage of an animal therethrough, said first passageway being positioned intermediate of said inlet opening and said second passageway, the arrangement of said passageways and said inlet opening providing a view of a clear and open path from said inlet opening through said first passageway and second passageway, movable closures adapted to close said inlet opening and said first passageway, means responsive to the presence of an animal in said entrance compartment for moving said closures into closed position, and trapping means for trapping an animal approaching said second passageway outwardly of said bait compartment to prevent entry of such approaching animal into said bait compartment.

6. In a trap for rodents, the combination of an entrance compartment, said entrance compartment having an inlet opening for rodents, a bait compartment adjacent said entrance compartment, said bait compartment and said entrance compartment having a common opening, said bait compartment having another opening opposite said common opening, said inlet opening, said common opening and said another opening being suitably dimensioned for passage of a rodent therethrough and being arranged in substantial alignment to provide a clear view and open path therethrough, movable closures adapted to close said inlet opening and said common opening, first means responsive to movement of a rodent in said entrance compartment for moving said closures into closed position, a closing member adapted to close said another opening, and second means responsive to the presence of a rodent in the vicinity of said another opening outwardly of said bait compartment for moving said closing member into closed position.

7. In a trap for rodents, the combination of an entrance compartment, said entrance compartment having an inlet opening for rodents, a bait compartment adjacent said entrance compartment, said bait compartment and said entrance compartment having a common opening, said bait compartment having another opening opposite said common opening, said inlet opening, said common opening and said another opening being suitably dimensioned for passage of a rodent therethrough and being arranged in substantial alignment to provide a clear view and open path therethrough, movable closures adapted to close said inlet opening and said common opening, means responsive to movement of a rodent in said entrance compartment for moving said closures into closed position, and trapping means for trapping a rodent approaching said another opening outwardly of said bait compartment to prevent entry of such approaching rodent into said bait compartment.

8. In a trap for rodents, the combination of a bait compartment, said bait compartment having opposite openings therein, trapping compartments positioned on the opposite sides of said bait compartment, said trapping compartments each having an opening common with a said opposite opening of said bait compartment, said trapping compartments each having an inlet opening for entry of rodents thereinto, all said openings being dimensioned for passage of a said rodent therethrough and arranged in series to present a clear view and open path from each inlet opening through the bait compartment to the other inlet opening, and trapping means for trapping rodents entering said trapping compartments through said inlet openings to prevent the passage of said rodents through said bait compartment and to prevent the escape of rodents approaching said bait compartment through either of trapping compartments, said trapping means including closure means for closing said openings and responsive to a rodent in a said trapping compartment for operating said closure means.

9. In an animal trap, the combination of a plurality of aligned compartments, including two end compartments and an intermediate compartment, said compartments having an open and clear passageway extending through from one end to the other end of the aligned compartments to offer enticement to animals approaching said ends, and trapping means for each end compartment, said trapping means including closure means adapted to close the said passageway at the opposite ends of said each end compartment and operating means responsive to the presence of an animal in said each end compartment and adapted to move said closure means to closed position for trapping animals entering said each end compartment, each of said trapping means cooperating with the other said trapping means to block the entry of an animal into the intermediate compartment from the other of said end compartments.

10. In an animal trap, the combination of an entrance compartment, said entrance compartment having an inlet opening for animals, a bait compartment for holding bait to entice animals, a passageway between said entrance compartment and said bait compartment, said bait compartment having an opening at a distance from said passageway, said inlet opening, said passageway and said bait-compartment opening being dimensioned and arranged to provide a clear escape path and view from said inlet opening through said passageway and through said bait-compartment opening, first means for closing off said inlet opening and said passageway, second means for moving said first means to closed position and operable in response to the entry of an animal moving through said inlet opening in a first direction and into said entrance compartment to trap said animal, third means for closing off said bait-compartment opening, fourth means for moving said third means to closed position and operable in response to the approach of an animal to said bait-compartment opening from a second and opposite direction outwardly of said bait compartment, and fifth means for preventing escape of an animal approaching said bait-compartment opening, whereby the enticement of said clear escape path and view through said trap is obtained, the entrapment of animals in said entrance compartment is provided for, the entry of animals into said bait compartment through either said passageway or said bait-compartment opening is prevented, and the escape of animals to give warning of said trap to other animals is prevented.

CARLO GROSSI.

REFERENCES CITED

The following references are of record in the file of this patent:

UNITED STATES PATENTS

| Number | Name | Date |
| --- | --- | --- |
| 405,006 | Brawn | June 11, 1889 |
| 638,476 | Ruckersberg | Dec. 5, 1899 |
| 1,126,801 | Lowrey | Feb. 2, 1915 |
| 2,273,008 | Fisher | Feb. 17, 1942 |
| 2,387,328 | Horowitz | Oct. 23, 1945 |

FOREIGN PATENTS

| Number | Country | Date |
| --- | --- | --- |
| 153,519 | Great Britain | Nov. 11, 1920 |